US012618739B2

(12) United States Patent
Wetzig et al.

(10) Patent No.: US 12,618,739 B2
(45) Date of Patent: May 5, 2026

(54) TEST LEAKAGE DEVICE

(71) Applicant: INFICON GMBH, Cologne (DE)

(72) Inventors: Daniel Wetzig, Cologne (DE);
Maximilian Reismann, Cologne (DE);
Josef Grenz, Cologne (DE); **Hendrik
Van Triest**, Cologne (DE)

(73) Assignee: INFICON GMBH, Cologne (DE)

( * ) Notice: Subject to any disclaimer, the term of this
patent is extended or adjusted under 35
U.S.C. 154(b) by 524 days.

(21) Appl. No.: 18/011,695

(22) PCT Filed: May 25, 2021

(86) PCT No.: PCT/EP2021/063920
§ 371 (c)(1),
(2) Date: Dec. 20, 2022

(87) PCT Pub. No.: WO2021/259579
PCT Pub. Date: Dec. 30, 2021

(65) Prior Publication Data
US 2023/0251159 A1 Aug. 10, 2023

(30) Foreign Application Priority Data

Jun. 26, 2020 (DE) ..................... 10 2020 116 939.6

(51) Int. Cl.
G01M 3/02 (2006.01)
G01M 3/00 (2006.01)
(52) U.S. Cl.
CPC .................................. G01M 3/007 (2013.01)
(58) Field of Classification Search
CPC .................................. G01M 3/02; G01M 3/007
See application file for complete search history.

(56) References Cited

U.S. PATENT DOCUMENTS 3,062,012 A * 11/1962 Allen ...................... E21B 47/10
73/40.5 R
2011/0247498 A1* 10/2011 Schwartz .............. G01M 3/205
96/11

FOREIGN PATENT DOCUMENTS

DE 10122733 A1 11/2002
DE 101 62 126 A1 7/2003
WO 03/052371 A1 6/2003

OTHER PUBLICATIONS

International Search Report and Written Opinion dated Aug. 23,
2021, which issued in the corresponding PCT Patent Application
No. PCT /E P2021 /063920.

* cited by examiner

*Primary Examiner* — John E Breene
*Assistant Examiner* — Alex T Devito
(74) *Attorney, Agent, or Firm* — Dickinson Wright PLLC

(57) ABSTRACT

In a test leakage device (10) for testing the functionality and
for calibrating a gas leak detection device having an evacu-
able test chamber (34) for receiving a test object and the test
leakage device (10), wherein the test leakage device (10) has
a base (12), a cover (16) and at least one side wall (14)
connecting the base (12) to the cover (16), which surround
an interior space (20) which can be filled with a test gas or
a test liquid, provision is made for the base (12) to have a
membrane (24) which is permeable to the test gas or
constituents of the test liquid, and for mutually opposite
sections of that inner side (18) of the side wall (14) which
faces the interior space (20) to be at a greater distance from
one another in the region of the cover than in the region of
the base.

15 Claims, 1 Drawing Sheet

TEST LEAKAGE DEVICE

Figure 1:
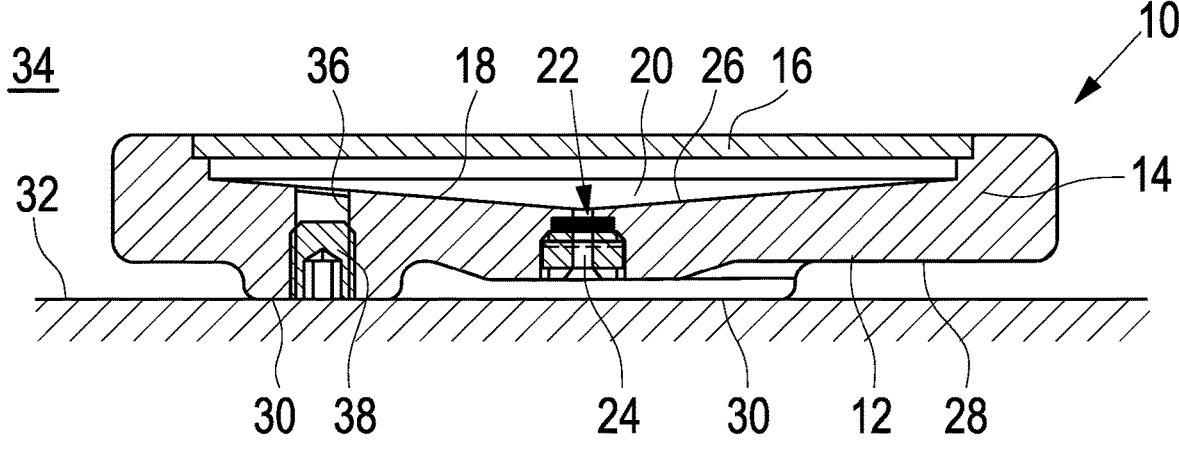

The invention relates to a test leakage device for testing the functionality of and for calibrating a gas leak detection device.

Gas leak detection devices typically comprise an evacuable test chamber into which a test object filled with gas or liquid is placed. The test chamber has a gas analysis device connected thereto which analyzes the gas drawn from the test chamber to detect possible leakage gas that has escaped into the test chamber through a leak in the test object or to detect a liquid that escapes through the leak and is evaporated. Here, it is of particular importance to be able to infer the size of the leak from the amount of the leakage gas detected. For this purpose, test leakage devices are used which contain a predefined amount of a known test gas or test fluid and are provided with a leak having known dimensions and/or a known permeability to the fluid contained. Test leakage devices are typically used to test the functionality of a gas leak detection device and to calibrate the gas leak detection device.

The leak of a test leakage device is often designed as a membrane, the leakage rate of which depends on the permeability of the membrane body to the respective test gas or test fluid, the membrane temperature, the temperature and the vapor pressure of the test gas/test fluid, the degree of wetting of the membrane on the inner side/fluid side, and the ventilation on the exit side of the membrane, i.e. on the outer side of the test leakage device.

EP 2 447 694 B1, for example, describes a liquid-filled test leakage from which gas or vapor or liquid components transported by gas escape. The gases or the vapor or the liquid components transported by the gas, which escape from the test leakage, are formed by the liquid as a result of its particular vapor pressure or by permeation through a solid layer of a membrane.

The leakage rate of a membrane test leakage depends on whether and to what degree the inner side of the membrane is wetted with liquid. In this regard, it may have a significant influence on the leakage rate, whether the membrane is in direct contact with a liquid or only with a liquid vapor. In order to obtain a stable leakage rate, it should either be prevented that liquid reaches the membrane or it should be ensured that only liquid vapor comes into contact with the membrane.

DE 10 2014 200 907 B4 describes a reference outgassing system with a reservoir containing a fluid or a fluid mixture. A transport vacuum chamber surrounds the reservoir. A chamber pressure of less than 10 kPa prevails in the transport vacuum chamber.

It is an object of the invention to provide an improved test leakage device having a membrane with a stable leakage rate.

The test leakage device is defined by the features of claim 1 or by the features of claim 2.

According thereto, the test leakage device comprises a base, a cover and at least one side wall connecting the base to the cover, the base, the cover and the side wall surrounding an interior space which can be filled with a test gas or with a test liquid. The test leakage device is provided with a membrane permeable to the test gas or to components of the test liquid, so that the test gas or components of the test liquid can escape from the test leakage device through the membrane.

The characteristic of the invention is that the membrane is provided in the base of the test leakage device, and that mutually opposite sections of the inner side of the side wall, which faces the interior, are spaced farther from each other in the region of the cover than in the region of the base. As a consequence, the distance between the opposing sections of the side wall decreases from the cover toward the base, so that the test fluid contained in the interior space is guided by gravity along the sections of the side wall towards the membrane.

As an alternative, a recess can be formed in the base of the test leakage device, wherein the recess has an inner side facing the interior, and mutually opposite sections of this inner side are spaced farther from each other in the region of the cover than in the region of the base. In other words, the mutually opposite sections of the inner side are at a distance from each other that decreases from the top (from the cover) to the bottom (towards the base).

The distance between the mutually opposite sections of the inner side of the side wall or the recess, which faces the interior, preferably decreases continuously from the cover to the base. The inner side may surround the interior space cylindrically and, in particular, taper conically towards the membrane. Here, it is particularly advantageous if, in the region of the base, the inner side adjoins the membrane or a through opening formed in the base and containing the membrane.

In this case, the through opening and/or the membrane can be formed in a cylindrical shape and have a circular surface facing the interior, the inner side of the side wall or the recess adjoining the outer edge thereof.

The lower side of the base facing away from the interior, i.e. the outer side of the base facing the bottom of a test chamber when the test leakage device is placed on the bottom of a test chamber of a gas leak detection device, is advantageously provided with at least one spacer that prevents the lower side of the base from contacting the bottom of the test chamber when the test leakage device is contained in the test chamber. The spacers facilitate the escape of the test fluid or the vapor of the test fluid from the test leakage device through the membrane into the test chamber in the region between the test leakage device and the test chamber bottom and enable a uniform distribution of the test fluid or the vapor in the test chamber.

The test leakage device preferably comprises a filling opening closed by a valve.

The invention offers the advantage that due to the distance between the opposite sections of the inner side decreasing towards the membrane or the through opening in the base, the membrane body is uniformly wetted with test fluid, since gravity moves the test fluid within the test leakage device towards the base and thus towards the membrane. The storage volume for the test fluid, which is enclosed by the base, the cover and the side wall of the test leakage device, thus tapers from the top down towards the membrane.

Figure 2:
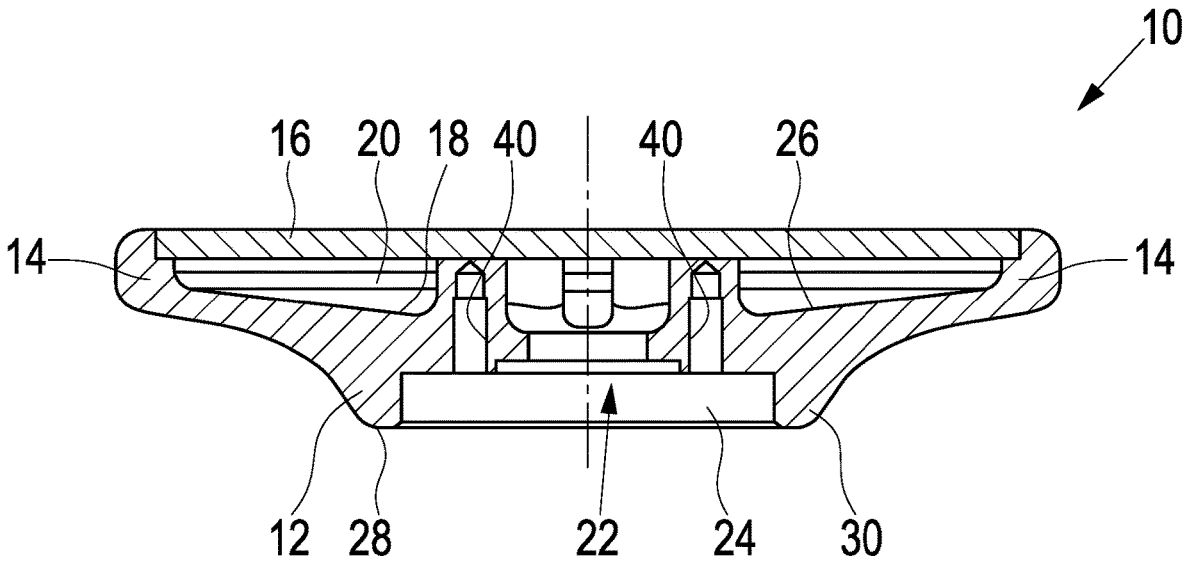

Embodiments of the invention will be explained in more detail hereunder with reference to the Figures. In the drawings:

FIG. 1 is a cross section through a first embodiment of the test leakage device and FIG. 2 is a cross section through a second embodiment of the test leakage device.

In both embodiments the test leakage device has a base 12 which is integrally surrounded by a circumferential side wall 14 protruding laterally from the outer edge of the base. A cover 16 is connected with the side wall in a fluid-tight manner, such that the base 12, the side wall 14 and the cover 16 enclose an interior space 20 in a fluid-tight manner. The interior space 20 can therefore be filled with a test fluid, i.e. a test gas or a test liquid.

A through opening 22 is formed in the base 12, which communicates the interior space 20 with the outer environment of the test leakage device, a membrane 24 being inserted therein, which is configured to be permeable to the test or to components of the test fluid. Thereby, the test fluid contained in the interior space 20 can escape from the test leakage device only via the membrane 24.

The side wall 14 is configured as a ring circumferentially protruding from the base 12 in a cylindrical shape along the outer circumference of the base 12, the inner side 26 of which forms a cone that tapers towards the membrane 24 and the through opening 22. At its lower end facing the base 12, the cone has a central opening that opens into the through opening 22 and adjoins the membrane 24.

Due to the fact that the base 12 and the side wall 14 are integrally connected with each other, the cone of the inner side 26 may also be seen as a recess in the base 12.

Due to the effect of gravity and the diameter of the interior space 20 tapering towards the through opening 22 and the membrane 24, the test fluid contained in the interior space 20 flows along the inner side 18 into the through opening 22 and towards the membrane 24. The membrane is thus uniformly wetted by test fluid as soon as the test leakage device 10 stands upright on a substrate, e.g. the bottom 32 of the test chamber 34 of a gas leak detection device not fully illustrated in the Figures.

In the embodiment of FIG. 1, the lower side 28 of the base 12 is provided with a plurality of spacers 30 in the form of protrusions 30 protruding downward beyond the lower side 28. The spacers 30 create a distance between the lower side 28 and the bottom of a test chamber, when the test leakage device 10 stands on the test chamber bottom. In the Figure, the bottom of the test chamber is identified by the reference numeral 32, while the test chamber is identified by the reference numeral 34.

In the region of one of the spacers 30, the base 12 is provided with a filling opening 36 that communicates the interior space 20 with the outer environment of the test leakage device 10 and is closed with a valve 38. The valve 38 is configured such that test fluid can be filled into the interior space 20 from outside, but cannot escape from the interior space 20 to the outside via the filling opening 36.

In the embodiment of FIG. 2, the lower side 28 of the base 12 has a shape formed in the manner of a plate and concentrically surrounding the through opening 22, without separate spacers 30 being formed integrally with the base. The membrane 24 is inserted in the lower end of the through opening 22. The through opening 22 opens into the interior space 20 with a reduced diameter when compared to the membrane 24. The through opening 22 is concentrically surrounded by bore holes 40 into which fastening elements in the form of screws for fastening the membrane 24 are inserted and in which they are retained by means of a conventional screw connection with threaded engagement in the second embodiment. The screw heads, not illustrated in FIG. 2, of the screws inserted upward into the openings 40 from below protrude downward beyond the lower side 28 of the base 12 and thus form spacers comparable with the spacers 30 of the first embodiment.

The invention claimed is:

1. A test leakage device for testing the functionality and for calibrating a gas leak detection device which comprises an evacuable test chamber for receiving the test leakage device, wherein the test leakage device comprises a base, a cover and at least one side wall connecting the base to the cover, wherein the base, the cover and the at least one side wall surround an interior space which can be filled with a test gas or a test liquid, wherein the base has a membrane which is permeable to the test gas or constituents of the test liquid, and mutually opposite sections of the inner side of the side wall which faces the interior space are at a greater distance from one another in the region of the cover than in the region of the base, wherein the distance of the mutually opposite sections of the inner side of the side wall facing the interior space decreases continuously from the cover to the base.

2. The test leakage device according to claim 1, wherein the inner side of the side wall cylindrically surrounds the interior space and conically tapers towards the membrane.

3. The test leakage device according to claim 1, wherein, in the region of the base, the inner side of the side wall adjoins a through opening comprising the membrane.

4. The test leakage device according to claim 3, wherein the through opening is formed in a cylindrical shape and has a circular surface facing the interior, the outer edge of which adjoins the inner side of the side wall.

5. The test leakage device according to claim 1, wherein the lower side of the base facing away from the interior space is provided with at least one spacer that prevents the lower side of the base from contacting the bottom of the test chamber, when the test leakage device is contained in the test chamber.

6. The test leakage device according to claim 1, wherein the test leakage device has a filling opening closed with a valve.

7. The test leakage device according to claim 1, wherein the base and the side wall are formed as an integral part and the inner side is formed as a recess in the integral part.

8. A test leakage device for testing the functionality and for calibrating a gas leak detection device which comprises an evacuable test chamber for receiving the test leakage device, wherein the test leakage device has a base, a cover and at least one side wall connecting the base to the cover, wherein the base, the cover and the at least one side wall surround an interior space which can be filled with a test gas or a test liquid, wherein the base has a membrane which is permeable to the test gas or constituents of the test liquid, and the base has a recess with an inner side facing the interior space, wherein mutually opposite sections of the inner side are at a greater distance from one another in the region of the cover than in the region of the base, wherein the distance of the mutually opposite sections of the inner side of the side wall facing the interior space decreases continuously from the cover to the base.

9. The test leakage device according to claim 8, wherein the distance of the mutually opposite sections of the inner side of the side wall facing the interior space decreases continuously from the cover to the base.

10. The test leakage device according to claim 8, wherein the inner side of the side wall cylindrically surrounds the interior space and conically tapers towards the membrane.

11. The test leakage device according to claim 8, wherein, in the region of the base, the inner side of the side wall adjoins a through opening comprising the membrane.

12. The test leakage device according to claim 11, wherein the through opening is formed in a cylindrical shape and has a circular surface facing the interior, the outer edge of which adjoins the inner side of the side wall.

13. The test leakage device according to claim 8, wherein the lower side of the base facing away from the interior space is provided with at least one spacer that prevents the lower side of the base from contacting the bottom of the test chamber, when the test leakage device is contained in the test chamber.

14. The test leakage device according to claim 8, wherein the test leakage device has a filling opening closed with a valve.

15. The test leakage device according to claim 8, wherein the base and the side wall are formed as an integral part and the inner side is formed as a recess in the integral part.

* * * * *